(12) United States Patent
Koren et al.

(10) Patent No.: US 9,759,555 B2
(45) Date of Patent: Sep. 12, 2017

(54) HIGH THROUGHPUT TRIANGULATION SYSTEM

(71) Applicant: CAMTEK LTD., Migdal-Haemek (IL)

(72) Inventors: Shimon Koren, Haifa (IL); Tomer Gilad, Kiryat Tivon (IL)

(73) Assignee: CAMTEK LTD., Migdal Haemeq (IL)

( * ) Notice: Subject to any disclaimer, the term of this patent is extended or adjusted under 35 U.S.C. 154(b) by 0 days.

(21) Appl. No.: 15/158,665

(22) Filed: May 19, 2016

(65) Prior Publication Data

US 2017/0010093 A1     Jan. 12, 2017

Related U.S. Application Data

(60) Provisional application No. 62/190,266, filed on Jul. 9, 2015.

(51) Int. Cl.
*G01B 11/24* (2006.01)
*G01B 11/25* (2006.01)

(52) U.S. Cl.
CPC .......... *G01B 11/2522* (2013.01); *G01B 11/25* (2013.01)

(58) Field of Classification Search
CPC .......................... G01B 11/303; G01B 11/0608
USPC ........................................................ 356/606
See application file for complete search history.

(56) References Cited

U.S. PATENT DOCUMENTS

| | | | | |
|---|---|---|---|---|
| 5,243,405 A | * | 9/1993 | Tichenor | G01B 11/303 356/600 |
| 2009/0012743 A1 | * | 1/2009 | McDonnell | G01B 11/303 702/167 |
| 2010/0128276 A1 | * | 5/2010 | De Groot | G01B 11/2441 356/450 |
| 2014/0362208 A1 | * | 12/2014 | Koren | H04N 13/0253 348/87 |

* cited by examiner

*Primary Examiner* — Sunghee Y Gray
(74) *Attorney, Agent, or Firm* — Reches Patents (57) ABSTRACT

A system for measuring heights of multiple structures of an object, the system may include an illumination module that is configured to illuminate the object by a light strip that is spatially incoherent; multiple cameras; a collection module that is configured to collect light that is reflected from the object and to distribute the light to the multiple cameras; wherein the collection module has an elongated field of view that has a longitudinal axis that is parallel to the light strip; wherein the multiple cameras are configured to generate, during a height measurement process, detection signals indicative of heights of the multiple structures; a mechanical stage for introducing a movement, during the height measurement process, between the object and each one of the illumination module and the collection module; and a processor that is configured to process the detection signals to determine the heights of the multiple structures.

24 Claims, 6 Drawing Sheets

HIGH THROUGHPUT TRIANGULATION SYSTEM

RELATED APPLICATIONS

This application claims the priority of U.S. provisional patent Ser. No. 62/190,266 filing date Jul. 9, 2015 which is incorporated herein by reference.

BACKGROUND OF THE INVENTION

A triangulation system may use a general purpose camera and illuminate an object with a single line of light. An example of a triangulation system is provided in U.S. Pat. No. 8,363,229 of Ben-Levi teaches a triangulation system and is incorporated herein by reference.

The throughput of the triangulation system is limited by up to date area camera performance (on one side) and optical FOV limitation (on the other side).

Given the above, it is not feasible to extend the throughput of the triangulation system without scarifying optical performances or implementing super-expensive custom camera design.

SUMMARY

According to an embodiment of the invention there may be provided a system for measuring heights of multiple structures of an object, said system may include an illumination module that is configured to illuminate the object by a light strip that is spatially incoherent, multiple cameras, a collection module that is configured to collect light that is reflected from the object and to distribute the light to the multiple cameras, wherein the collection module has an elongated field of view that has a longitudinal axis that is parallel to the light strip, wherein the multiple cameras are configured to generate, during a height measurement process, detection signals indicative of heights of the multiple structures, a mechanical stage for introducing a movement, during the height measurement process, between the object and each one of the illumination module and the collection module and a processor that is configured to process the detection signals to determine the heights of the multiple structures.

During the height measurement process, fields of view of different cameras of the multiple cameras cover the multiple structures of an object in an interlaced manner.

During the height measurement process, fields of view of different cameras of the multiple cameras cover the multiple structures of an object in an non-interlaced manner.

The system is configured to operate in an interlaced mode or in a non-interlaced mode, wherein when operating in the interlaced mode fields of view of different cameras of the multiple cameras cover the multiple structures of an object in an interlaced manner and wherein when operating in the non-interlaced mode the fields of view of different cameras of the multiple cameras cover the multiple structures of an object in a non-interlaced manner.

During the height measurement process, different cameras of the multiple cameras exhibit different focus conditions.

During the height measurement process, different cameras of the multiple cameras are configured to obtain information from different heights.

The multiple structures are microscopic bumps.

The system, when operating in an interlaced mode each microscopic bump of the microscopic bumps is imaged by up to a single camera of the multiple cameras.

The system when operating in non-interlaced mode each microscopic bump of the microscopic bumps is imaged by a plurality of cameras of the multiple cameras.

According to an embodiment of the invention there may be provided a method for measuring heights of multiple structures of an object. The method may include illuminating, by an illumination module of an inspection system, the object by a light strip that is spatially incoherent, collecting, by a collection module, light that is reflected from the object and distributing the light to multiple cameras, wherein the collection module has an elongated field of view that has a longitudinal axis that is parallel to the light strip, generating, by the multiple cameras, during a height measurement process, detection signals indicative of heights of the multiple structures, introducing a movement, by a mechanical stage and during the height measurement process, between the object and each one of the illumination module and the collection module and processing, by a processor, the detection signals to determine the heights of the multiple structures.

During the height measurement process, fields of view of different cameras of the multiple cameras cover the multiple structures of an object in an interlaced manner.

During the height measurement process, fields of view of different cameras of the multiple cameras cover the multiple structures of an object in an non-interlaced manner.

The method may include configuring the inspection system to operate in an interlaced mode or in a non-interlaced mode, wherein when operating in the interlaced mode fields of view of different cameras of the multiple cameras cover the multiple structures of an object in an interlaced manner and wherein when operating in the non-interlaced mode the fields of view of different cameras of the multiple cameras cover the multiple structures of an object in a non-interlaced manner.

During the height measurement process, different cameras of the multiple cameras exhibit different focus conditions.

During the height measurement process, different cameras of the multiple cameras are configured to obtain information from different heights.

The multiple structures are microscopic bumps.

When operating in an interlaced mode each microscopic bump of the microscopic bumps is imaged by up to a single camera of the multiple cameras.

When operating in non-interlaced mode each microscopic bump of the microscopic bumps is imaged by a plurality of cameras of the multiple cameras.

BRIEF DESCRIPTION OF THE INVENTION

The present invention will be understood and appreciated more fully from the following detailed description taken in conjunction with the drawings in which.

DETAILED DESCRIPTION OF THE INVENTION

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

There is provided a high throughput triangulation system. The collection path of the triangulation system may include distribution optics such as one or more beam splitters for distributing collected light between two or more cameras and their corresponding optics.

Figure 1:
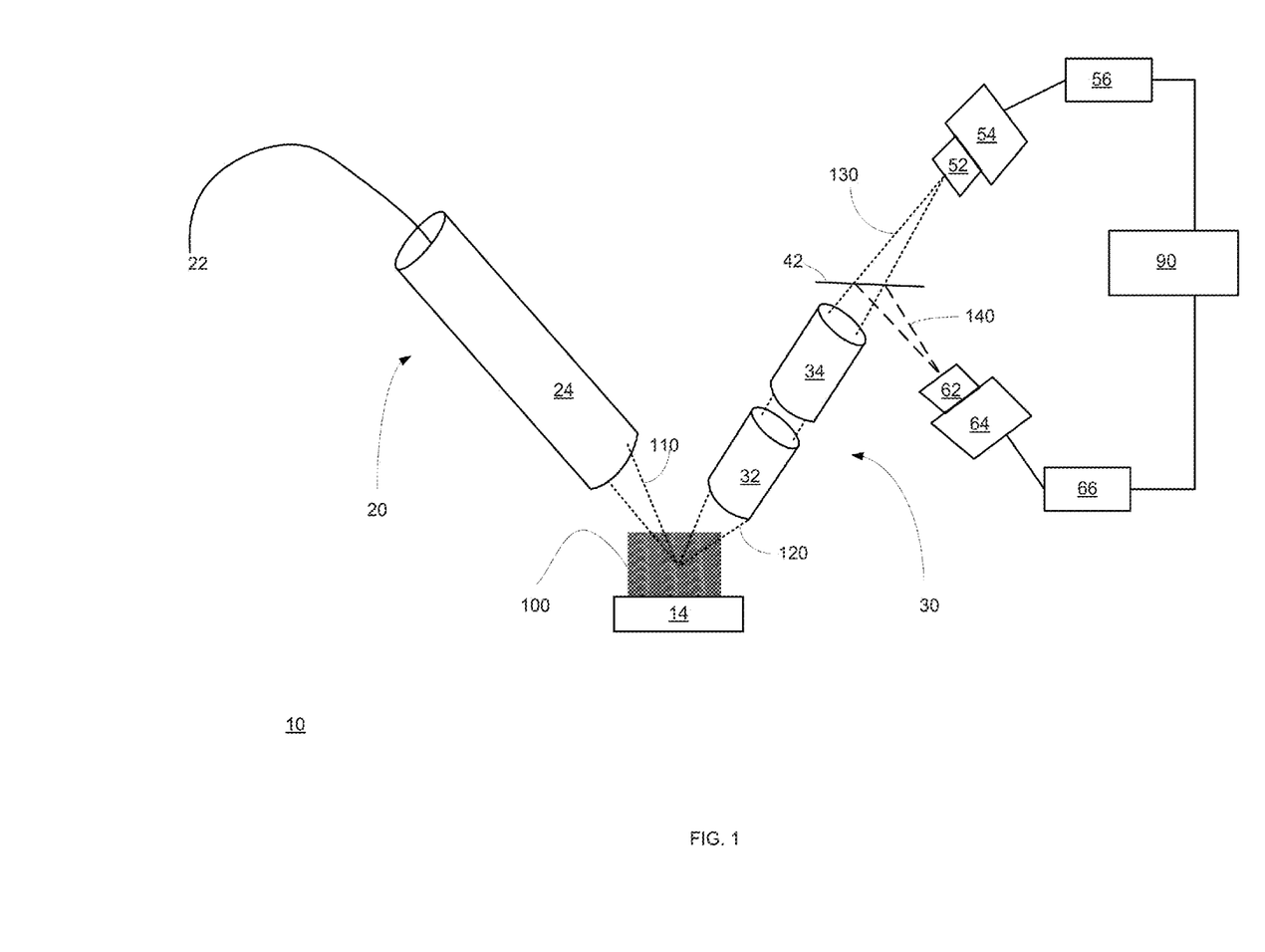
FIG. 1 illustrates a triangulation system and an object according to an embodiment of the invention.

FIG. 1 illustrates a triangulation system 10 according to an embodiment of the invention.

Triangulation system 10 includes illumination module 20, collection module 30, multiple cameras such as first camera 54 that is preceded by first camera optics 52 and second camera 62 that is preceded by second camera optics 64, mechanical stage 14, frame grabbers 56 and 66 as well as processor 90.

Illumination module 20 is configured to illuminate the object 100 with illuminating beam 110 to form on the object 100 a light strip (denoted 115 in FIG. 2) that is spatially incoherent. The object 100 includes a surface (denoted 101 in FIG. 2) and multiple structures such as but not limited to microscopic bumps (denoted 102 in FIG. 2). The illumination is done from a non-normal illumination angle.

Collection module 30 is configured to collect light that is reflected from the object and to distribute the light to multiple cameras.

The first and second cameras 54 and 64 are configured to generate, during a height measurement process, detection signals indicative of heights of the multiple structures.

Mechanical stage 14 is configured to introduce a movement, during the height measurement process, between the surface and each one of the illumination module 20 and the collection module 30.

Frame grabbers 56 and 66 are configured to obtain the detection signals from the cameras and generate first camera frames and second camera frames.

Processor 90 is configured to process the frames to determine the heights of the multiple structures. The processing may include applying any known triangulation process. For example—the processor may apply the triangulation process illustrated in U.S. Pat. No. 8,363,229 of Ben-Levi. Processor 90 may include one or more general purpose unit chips or cores, one or more image processor chips or cores, one or more FPGAs, one or more computers, and the like.

FIG. 1 illustrates the illumination module 20 as including a fiber 22 for feeding light to a Scheimpflug principle illumination module 24. Triangulation system 10 may include other illumination units. Triangulation system 10 may include one or multiple illumination units although using a single illumination unit reduced the cost of the triangulation system and prevents the creation of interference patterns, cross talks and prevents using compensations processes for compensating between differences between light generated by different illumination modules.

FIG. 1 also illustrates the collection module 30 as including an objective lens 32 that is followed by a tube lens 34 that is followed by a beam splitter 42 for splitting collected beam 120 to two beams 130 and 140 that are directed to first and second cameras respectively. Triangulation system 10 may include other collection units.

Figure 2:
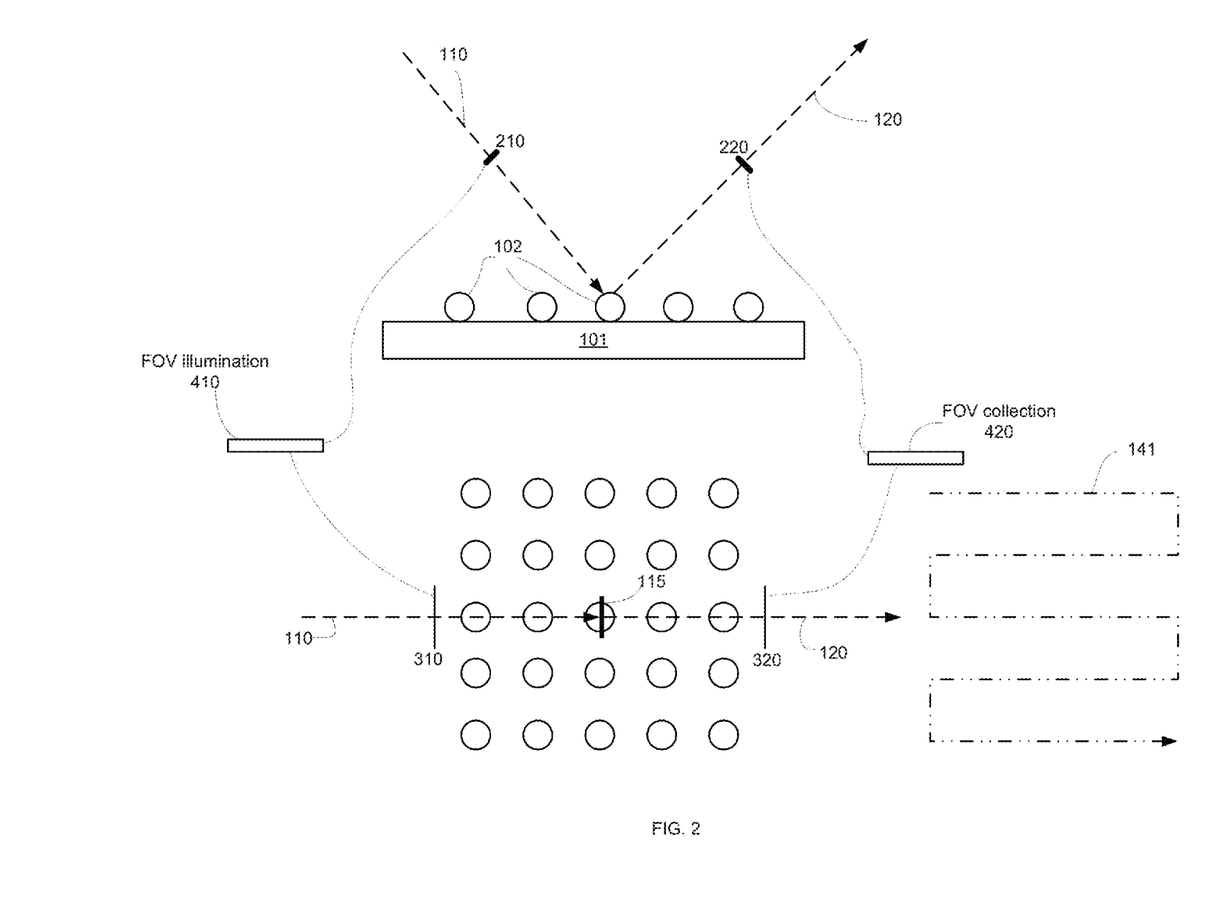
FIG. 2 illustrates the object and illumination and collected beams according to an embodiment of the invention.

FIG. 2 includes a top view and a side view of the object 100, the illumination beam 110, the light strip 115 formed on the object and the collected beam 120 according to an embodiment of the invention.

FIG. 2 illustrates that the collection module 30 has a collection field of view (FOV collection) 420 that is elongated, has a length (320) that is parallel to the longitudinal axis of the light strip 115 and a width (220) that is perpendicular to the longitudinal axis of the light strip 115. Accordingly—the collection module 30 collects light reflected within a narrow angular range.

FIG. 2 illustrates that the illumination module 20 has a illumination field of view (FOV illumination) 410 that is elongated, has a length (310) that is parallel to the longitudinal axis of the light strip 115 and a width (210) that is perpendicular to the longitudinal axis of the light strip 115. Accordingly—the illumination module 20 illuminates the object over a narrow angular range.

FIG. 2 also illustrates an example of a scan pattern 141 that is followed by mechanical stage 14. Other scan patterns may be provided.

Triangulation system 10 may operate in an interlaced mode or in a non-interlaced mode.

Figure 3:
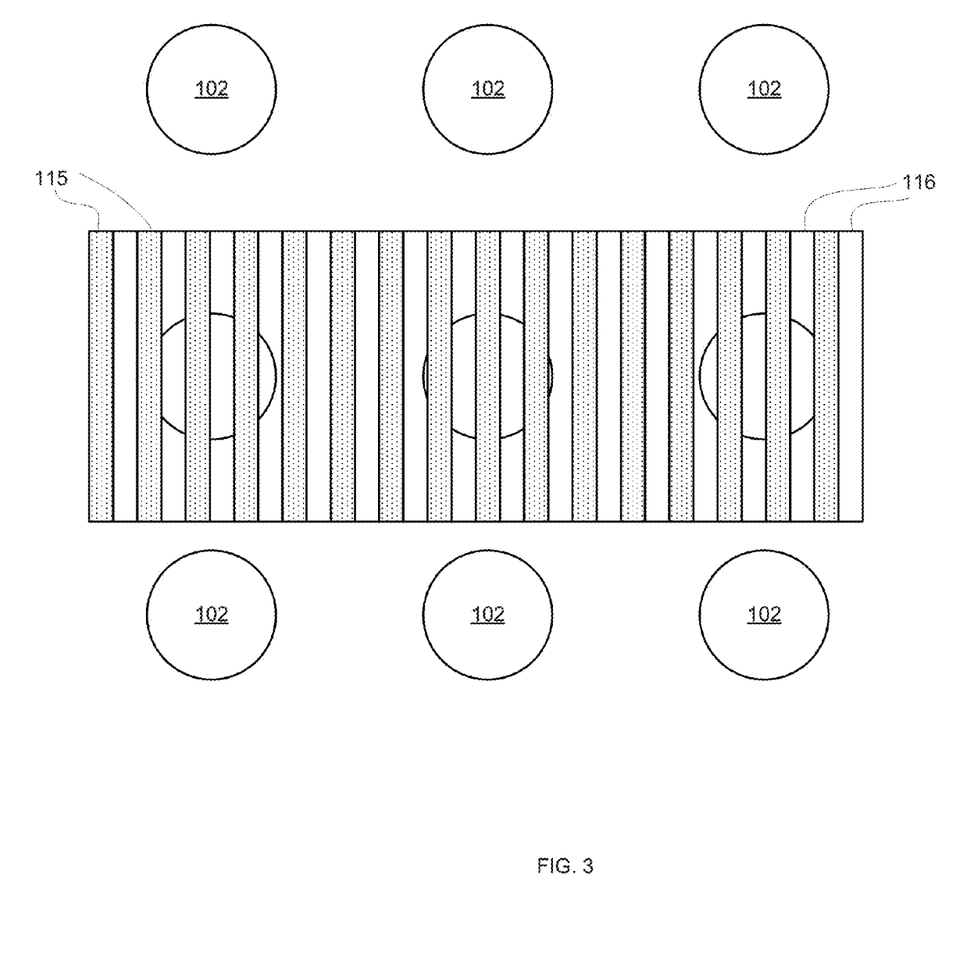
FIG. 3 illustrates the object and multiple light strips according to an embodiment of the invention.

FIG. 3 illustrates lights stripes formed on the object 100 at different points in time.

When operating in an interlaced mode a Line/Step "even" (light reflected from light strips 116) is captured by first camera 54 and Line/Step "odd" (light reflected from light strips 115) is captured by second camera 64. There may be a slight overlap between the odd and even lines/steps in order to compensate for mechanical inaccuracies and/or other system inaccuracies or errors—to prevent gaps in the image.

In the interlaced mode the throughput of the triangulation system is doubled in comparison to a single camera triangulation system.

When operating in an interlaced mode the system (processor 90 and/or frame grabbers 56 and 66) reconstruct a continuous frame from odd/even steps applying dedicated system calibration (to match cameras). While each camera is operating at given rate (frames per second FPS), the system actual speed is doubled to 2*FPS. This is illustrated in the timing diagrams of FIG. 4).

Figure 4:
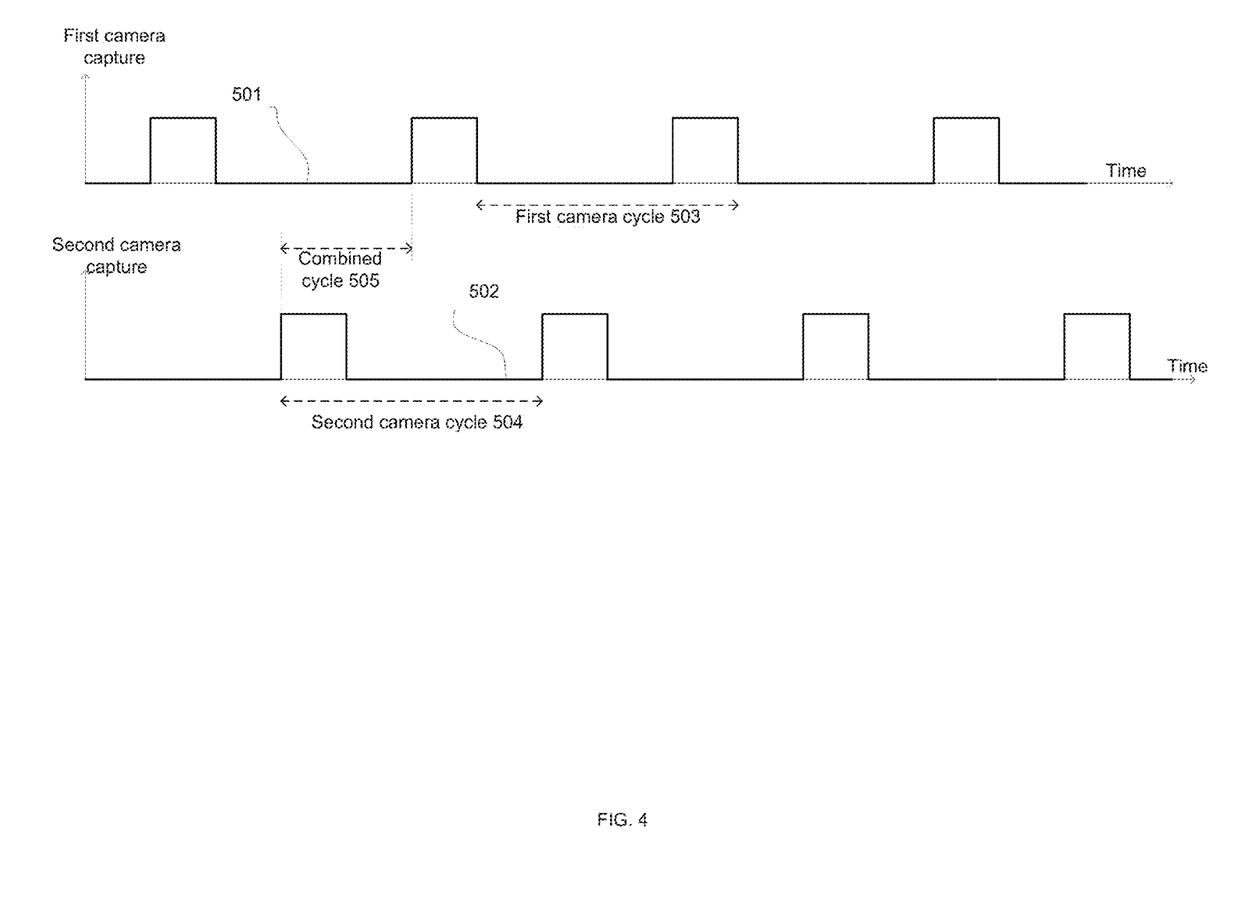
FIG. 4 is a timing diagram according to an embodiment of the invention.

FIG. 4 illustrates the pulses 501 used to trigger an image capture of the first camera 54 and the pulses 502 used to trigger an image capture of the second camera 54.

The cycle (1/FPS) of the first camera is denoted 503. The cycle (1/FPS) of the second camera is denoted 504. The combined cycle (1/FPS of both cameras) is denoted 505 and is one half of the first and second cameras cycles.

According to an embodiment of the invention the triangulation system 10 may operate in a non-interlaced manner. In this mode the cameras image the same areas and are used to increase the accuracy of the triangulation process or otherwise obtain more information about the object. In this mode each light strip is captured twice—by first camera 54 and by second camera 64.

The processor 90 may reconstruct frames from double-information. The process reduce the noise and improve the triangulation system precision without sacrificing speed FPS.

Both modes may differ from each other by software programming synchronization only. Thus—the triangulation system 10 may switch between the modes.

It has been found that when in dual camera configuration, when the throughput increase is fully utilized (×2), the mechanical stage speed is doubled and so is the distance on the wafer traveled by the line during exposure.

In order to maintain light intensity the exposure needs to be doubled. The overall effect is that at dual camera configuration the stage travels 4 times the distance traveled at present configuration during exposure.

Experiments showed that scan results are independent of the exposure time. This is expected when the step size is smaller than the width of the line. Since step size is usually 5 µm or below, and bumps become smaller, this issue should not raise difficulties.

According to an embodiment of the invention when operating in a non-interlaced mode the first and second cameras 54 and 64 may be configured to different focus conditions so that the focal planes of these cameras differ from each other and the first and second cameras obtain information about areas of the object that are located at different height.

Figure 5:
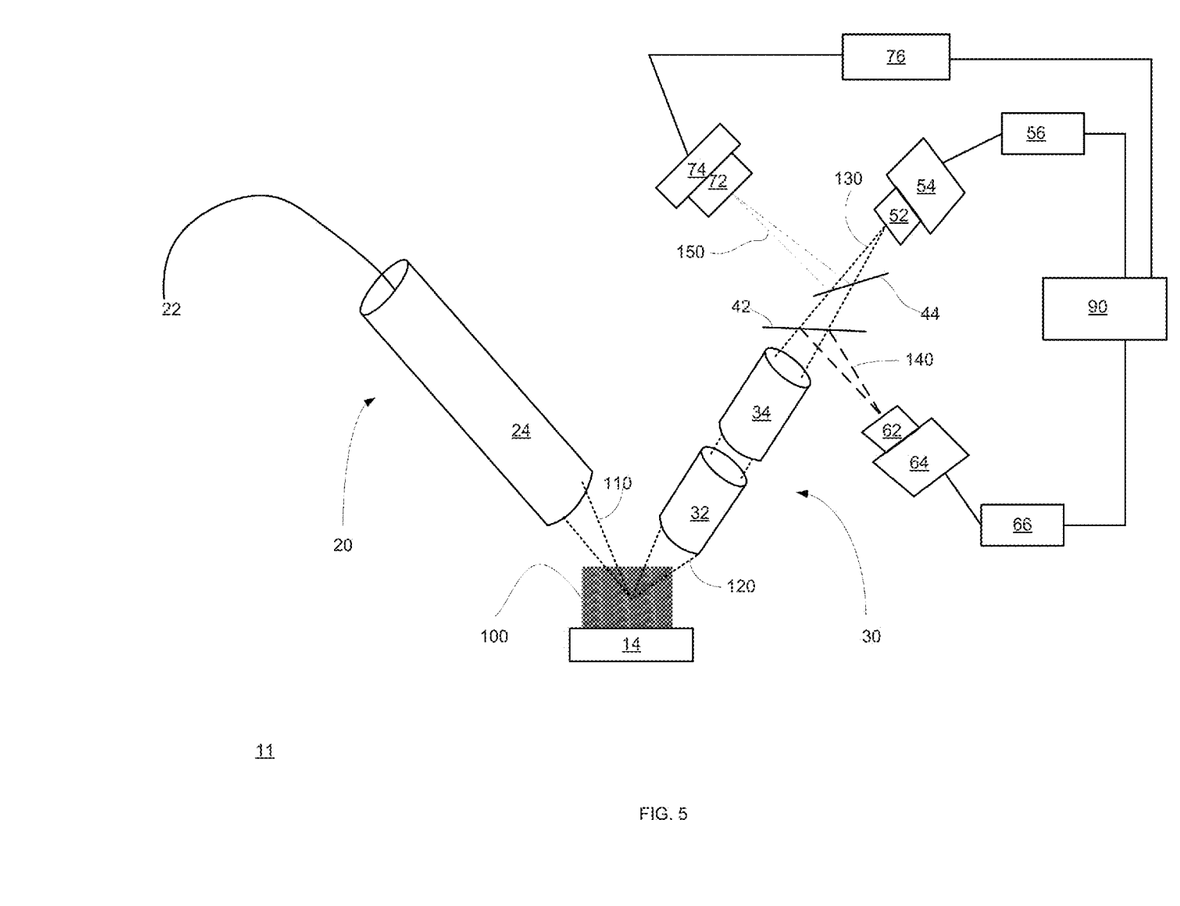
FIG. 5 illustrates a triangulation system and an object according to an embodiment of the invention.

It is noted that the triangulation may have more than two cameras. For example—FIG. 5 illustrates a triangulation system 11 that has three cameras. In comparison to triangulation system 10 of FIG. 1—triangulation system 11 includes an additional beam splitter 44, third camera optics 72, third camera 74 and third frame grabber 76. Additional beam splitter 44 and beam splitter 42 split the collected beam 120 to light beams 130, 140 and 150 that are collected by first, second, third cameras optics (52, 62 and 72) that are followed by first, second and third cameras 54, 64 and 74 and first, second and third image frame grabbers 56, 66 and 76 respectively.

The number of cameras per triangulation system may exceed three.

Figure 6:
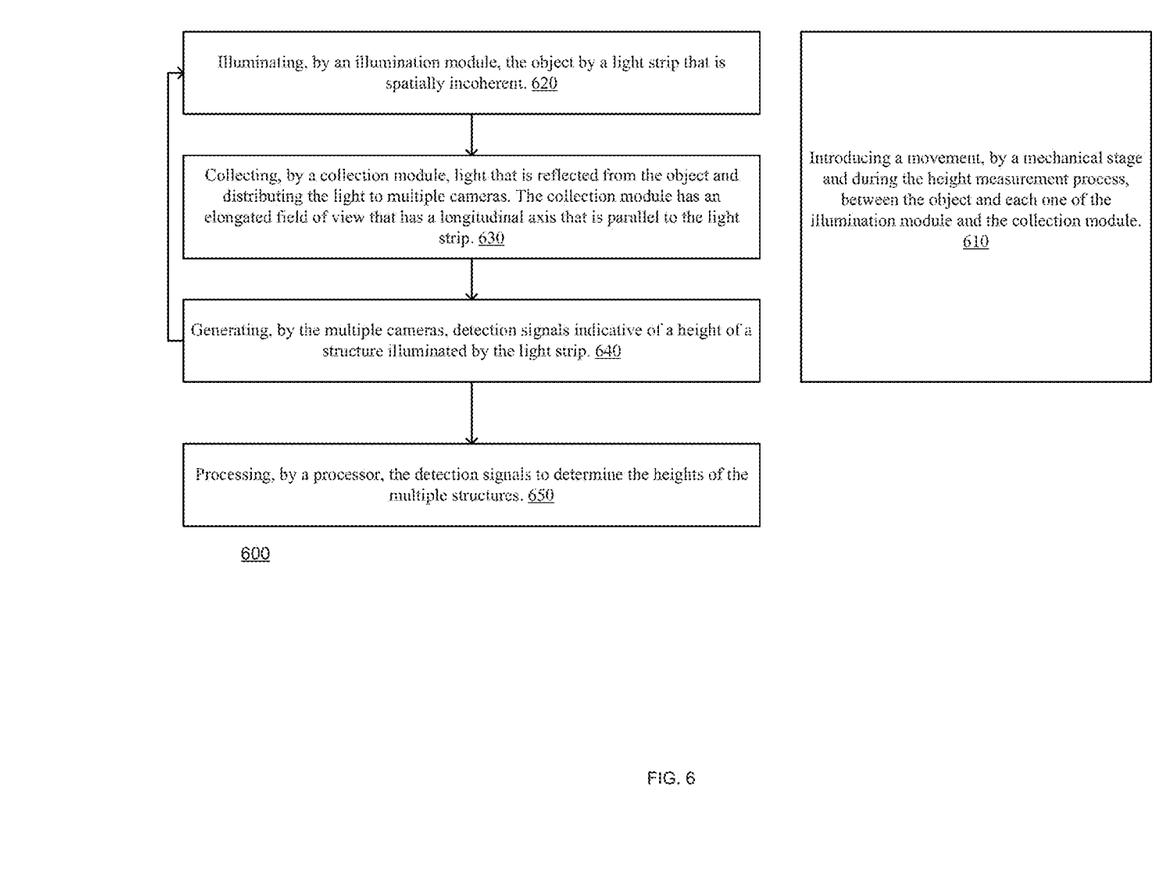
FIG. 6 illustrates a method according to an embodiment of the invention.

FIG. 6 illustrates method 600 according to an embodiment of the invention.

Method 600 may start by steps 610 and 620.

Step 620 may include illuminating, by an illumination module, the object by a light strip that is spatially incoherent.

Step 620 may be followed by step 630 of collecting, by a collection module, light that is reflected from the object and distributing the light to multiple cameras. The collection module has an elongated field of view that has a longitudinal axis that is parallel to the light strip.

Step 640 may be followed by generating, by the multiple cameras, detection signals indicative of a height of a structure illuminated by the light strip.

Steps 620, 630 and 640 are executed multiple times, during a height measurement process.

Step 610 is executed in parallel to step 620, 630 and 640.

Step 610 includes introducing a movement, by a mechanical stage and during the height measurement process, between he object and each one of the illumination module and the collection module.

The movement introduced in step 610 (in parallel to steps 620, 630 and 640) causes the light strip to impinge (during the repetitions of step 620) on the multiple features (at different points in time) of the object, to collect light (during the repetitions of step 630) reflected from the multiple features and distribute the light to the multiple cameras and to generate (during the repetitions of step 640) detection signals indicative of the heights of the multiple structures.

Step 640 is followed by step 650 of processing, by a processor, the detection signals to determine the heights of the multiple structures.

Step 650 may be repeated multiple times (processing the outcome of illuminating a feature with a single light strip) of be executed once per multiple repetitions of steps 620, 630 and 640.

Method 600 may include (not shown) reconstructing frames from the detection signals and sending the frames to a processor—to be processed by the processor.

Method 600 can be applied when the triangulation system operated in an interlaced mode and/or when operating in a non-interlaced mode.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

We claim:

1. A system for measuring heights of multiple structures of an object, said system comprising:
an illumination module that is configured to illuminate the multiple structures of the object by a light strip that is spatially incoherent;
multiple cameras;
a collection module that is configured to collect light that is reflected from the multiple structures of the object and to distribute the light to the multiple cameras;
wherein the collection module has an elongated field of view that has a longitudinal axis that is parallel to the light strip;
wherein the multiple cameras are configured to generate, based on the light that is reflected from the multiple structures of the object and during a height measurement process, detection signals indicative of heights of the multiple structures;
a mechanical stage for introducing a movement, during the height measurement process, between the object and each one of the illumination module and the collection module; and
a processor that is configured to process the detection signals to determine the heights of the multiple structures.

2. The system according to claim 1 wherein during the height measurement process, fields of view of different cameras of the multiple cameras cover the multiple structures of the object in an interlaced manner.

3. The system according to claim 2 wherein the fields of view of the different cameras of the multiple cameras partially overlap.

4. The system according to claim 1 wherein during the height measurement process, fields of view of different cameras of the multiple cameras cover the multiple structures of the object in a non-interlaced manner.

5. The system according to claim 1 wherein the system is configured to operate in an interlaced mode or in a non-interlaced mode;
wherein when operating in the interlaced mode fields of view of different cameras of the multiple cameras cover the multiple structures of an object in an interlaced manner;
and wherein when operating in the non-interlaced mode the fields of view of different cameras of the multiple cameras cover the multiple structures of an object in a non-interlaced manner.

6. The system according to claim 1 wherein during the height measurement process, different cameras of the multiple cameras have focal planes that differ from each other.

7. The system according to claim 1 wherein during the height measurement process, different cameras of the multiple cameras are configured in a different manner from each other to obtain information from areas of the object that are located at different heights.

8. The system according to claim 1 wherein the multiple structures are microscopic bumps.

9. The system according to claim 8 wherein when operating in an interlaced mode each microscopic bump of the microscopic bumps is imaged by up to a single camera of the multiple cameras.

10. The system according to claim 8 wherein when operating in non-interlaced mode each microscopic bump of the microscopic bumps is imaged by a plurality of cameras of the multiple cameras.

11. The system according to claim 1 wherein the illumination module is configured to illuminate the multiple structures of the object by the light strip and to prevent the creation of interference patterns.

12. A method for measuring heights of multiple structures of an object, the method comprises:
illuminating, by an illumination module of an inspection system, the multiple structures of the object by a light strip that is spatially incoherent;
collecting, by a collection module, light that is reflected from the multiple structures of the object and distributing the light to multiple cameras; wherein the collection module has an elongated field of view that has a longitudinal axis that is parallel to the light strip;
generating, by the multiple cameras, based on the light that is reflected from the multiple structures of the object and during a height measurement process, detection signals indicative of heights of the multiple structures;
introducing a movement, by a mechanical stage and during the height measurement process, between the object and each one of the illumination module and the collection module; and
processing, by a processor, the detection signals to determine the heights of the multiple structures.

13. The method according to claim 12 wherein during the height measurement process, fields of view of different cameras of the multiple cameras cover the multiple structures of object in an interlaced manner.

14. The method according to claim 13 wherein the fields of view of the different cameras of the multiple cameras partially overlap.

15. The method according to claim 13 further comprising reconstructing a continuous frame that spans over the fields of view of the different cameras of the multiple cameras.

16. The method according to claim 13 wherein at least one of the processor and a frame grabber of the system are configured to reconstruct a continuous a frame that spans over the fields of view of the different cameras of the multiple cameras.

17. The method according to claim 12 wherein during the height measurement process, fields of view of different cameras of the multiple cameras cover the multiple structures of the object in a non-interlaced manner.

18. The method according to claim 12 comprising configuring the inspection system to operate in an interlaced mode or in a non-interlaced mode;
wherein when operating in the interlaced mode fields of view of different cameras of the multiple cameras cover the multiple structures of an object in an interlaced manner; and
wherein when operating in the non-interlaced mode the fields of view of different cameras of the multiple cameras cover the multiple structures of an object in a non-interlaced manner.

19. The method according to claim 12 wherein during the height measurement process, different cameras of the multiple cameras have focal planes that differ from each other.

20. The method according to claim 12 wherein during the height measurement process, different cameras of the multiple cameras are configured in a different manner from each other to obtain information from areas of the object that are located at different heights.

21. The method according to claim 12 wherein the multiple structures are microscopic bumps.

22. The method according to claim 21 wherein when operating in an interlaced mode each microscopic bump of the microscopic bumps is imaged by up to a single camera of the multiple cameras.

23. The method according to claim 21 wherein when operating in non-interlaced mode each microscopic bump of the microscopic bumps is imaged by a plurality of cameras of the multiple cameras.

24. The method according to claim 12 wherein the illuminating, by the illumination module, the multiple structures of the object by the light strip comprises preventing a creation of interference patterns.

* * * * *